United States Patent
Amtmann et al.

(10) Patent No.: US 7,599,661 B2
(45) Date of Patent: Oct. 6, 2009

(54) METHOD FOR GENERATING POWER SUPPLY INTERRUPTION TIME INFORMATION IN A CONTACTLESS DATA CARRIER

(75) Inventors: Franz Amtmann, Graz (AU); Hubert Watzinger, Graz (AU); Roland Brandl, Graz (AU); Ewald Bergler, Weiz (AU)

(73) Assignee: NXP B.V., Eindhoven (NL)

( * ) Notice: Subject to any disclaimer, the term of this patent is extended or adjusted under 35 U.S.C. 154(b) by 167 days.

(21) Appl. No.: 10/584,100

(22) PCT Filed: Dec. 9, 2004

(86) PCT No.: PCT/IB2004/052727

§ 371 (c)(1),
(2), (4) Date: Jun. 22, 2006

(87) PCT Pub. No.: WO2005/064532

PCT Pub. Date: Jul. 14, 2005

(65) Prior Publication Data

US 2007/0176753 A1  Aug. 2, 2007

(30) Foreign Application Priority Data

Dec. 23, 2003  (EP)  ................... 03104969

(51) Int. Cl.
*H04B 5/00* (2006.01)

(52) U.S. Cl. .................. 455/41.1; 455/41.2; 455/46; 455/411; 340/572.1; 340/10.1; 340/457; 340/457.4; 340/540; 340/10.34

(58) Field of Classification Search ............... 455/41.1, 455/41.2, 46, 411; 340/572.1, 10.1, 457, 340/457.4, 540, 10.34

See application file for complete search history.

(56) References Cited

U.S. PATENT DOCUMENTS

| | | | | |
|---|---|---|---|---|
| 6,294,997 | B1 * | 9/2001 | Paratore et al. | 340/572.1 |
| 6,404,325 | B1 * | 6/2002 | Heinrich et al. | 340/10.34 |
| 6,812,841 | B2 * | 11/2004 | Heinrich et al. | 340/572.1 |
| 7,224,273 | B2 * | 5/2007 | Forster | 340/539.1 |
| 2003/0112128 | A1 | 6/2003 | Littlechild | |

FOREIGN PATENT DOCUMENTS

WO  WO 02/11054  2/2002

* cited by examiner

*Primary Examiner*—Lana N Le
*Assistant Examiner*—Ping Y Hsieh

(57) ABSTRACT

In a method for the determination of disconnection time information (DTI) significant for an inadequate power supply of an integrated circuit (2) of a data carrier (1) such as an RFID-tag. The disconnection time information (DTI) is determined on the basis of the discharge behavior of a first storage capacitor (C1), which is affected by the IC material and by radiation, and the determined disconnection time information (DTI) is corrected in dependence on the effects of the IC material and/or on at least one radiation effect.

19 Claims, 6 Drawing Sheets

METHOD FOR GENERATING POWER SUPPLY INTERRUPTION TIME INFORMATION IN A CONTACTLESS DATA CARRIER

The field of invention relates to a method for the determination of disconnection time information which is significant for a disconnection period, in which disconnection period an integrated circuit of a data carrier designed for contactless communication with a communication partner device has not been adequately supplied with power by means of a power supply field, wherein at least one first storage capacitor of the integrated circuit is charged while the integrated circuit is being adequately supplied, and wherein the at least one first storage capacitor is discharged from a first starting-time when the integrated circuit is subsequently no longer adequately supplied.

The field of invention further relates to an integrated circuit of a data carrier designed for contactless communication with a communication partner device, comprising a first charging circuit for charging at least one first storage capacitor of the integrated circuit while the integrated circuit is being adequately supplied with power by means of a power supply field, and comprising a first discharge circuit for discharging the storage capacitor from a first starting time when the integrated circuit is no longer adequately supplied.

The field of invention further relates to a data carrier for contactless communication with a communication partner device, which data carrier is provided with an integrated circuit as described in the previous paragraph.

A method, an integrated circuit and a data carrier of this type are, for instance, is known from the document US 2003/0112128 (Littlechild et al.). The known data carrier, often referred to as transponder or tag, is designed as a passive data carrier for contactless communication with a reader station, which reader station is here designed as a so-called "tunnel reader programmer" (TRP) and provides a power supply field used to supply the data carrier or the integrated circuit respectively. The data carrier is further designed to store a time stamp number or an identification number or configuration information or other temporary data for a defined period, which period should last at least as long as any temporary disconnection of the power or voltage supply of the data carrier. Such a temporary disconnection can, for instance, occur when the data carrier switches from a first TRP to a second TRP.

If several data carriers or transponders of this type are simultaneously in the communication area of a TRP, communication collisions are possible in a so-called inventory process—in which the TRP prompts the data carriers to transmit an identification number ID stored on each data carrier to the TRP—if many of the data carriers reply simultaneously. To counteract this problem, it is provided that the TRP can switch data carriers which have already been inventoried into a so-called mute state, whereby a mute command is transmitted to the already inventoried data carrier and a mute bit is then set and stored in the already inventoried data carrier. If a mute bit has been set, the already inventoried data carrier no longer reacts to renewed inventory attempts by the TRP.

The method used here for the determination of disconnection time information which is significant for an disconnection period, in which disconnection period the data carrier has not been adequately supplied with power, is based on a discharge process of a storage capacitor incorporated in the data carrier or in the integrated circuit of the data carrier. In normal operation, that is with uninterrupted power or voltage supply of the passive data carrier, the storage capacitor is continuously charged via a charging transistor, and the storage capacitor is therefore continuously connected to the power or voltage source of the passive data carrier via the charging transistor. If the voltage of the voltage source is reduced owing to a temporary disconnection of the power supply field, the supply of the storage capacitor by the charging transistor is interrupted, and the discharge of the storage capacitor is initiated with a defined discharge current via a discharge circuit. Using known physical laws governing the discharge of a storage capacitor, the disconnection information can easily be obtained by monitoring whether the voltage at the storage capacitor corresponds to a logic state "1" or to a logic state "0" when the energy supply field and thus the voltage supply is restored. In dependence on this, the data temporarily stored in a RAM, that is data such as identification numbers, status bits etc., are valid or invalid, with the provision that the status information is stored in the RAM for a longer time than the voltage at the storage capacitor requires to reach the boundary between the logic state "1" and the logic state "0".

In some significant applications, it is necessary for a data carrier to "remember" a set mute bit or the mute state at short temporary disconnections of the power supply field, but the mute bit should no longer be stored or remembered after a changeover from one reader station to another reader station, which changeover involves a comparatively longer disconnection of the power supply field, so that the data carrier can reply to an inventory prompt of the other reader station. The known data carriers cannot be used efficiently in this application, which is a major drawback.

A further disadvantage of the known data carrier lies in the fact that the capacitance of the storage capacitor has to be relatively high to monitor longer periods of a temporary disconnection of the power supply field and that the storage capacitor therefore has to be larger, which has a particularly disadvantageous effect on the space requirement of the storage capacitor in the data carrier or the integrated circuit of the data carrier.

It is an object of the invention to eliminate the disadvantageous conditions described above and to create an improved method and an improved integrated circuit for a data carrier designed for contactless communication with a communication partner device plus an improved data carrier designed for contactless communication with a communication partner device.

To achieve the object described above, features according to the invention are provided in a method according to the invention, so that a method according to the invention can be characterized in the following way:

A method of determinating a disconnection time information which is significant for a disconnection period, in which disconnection period an integrated circuit of a data carrier designed for contactless communication with a communication partner device has not been adequately supplied with power by means of a power supply field, wherein at least one first storage capacitor of the integrated circuit is charged while the integrated circuit is being adequately supplied, and wherein the at least one first storage capacitor is discharged from a first starting time when the integrated circuit is subsequently no longer adequately supplied, and wherein the disconnection time information is determined on the basis of the discharge behavior, which is affected by the IC material and by radiation, of the at least one first storage capacitor and wherein the determined disconnection time information is corrected in dependence on the effects of the IC material and/or on at least one radiation effect.

To achieve the object described above, features according to the invention are provided in an integrated circuit for a data carrier according to the invention, so that an integrated circuit according to the invention can be characterized in the following way:

An integrated circuit of a data carrier designed for contactless communication with a communication partner device, comprising a first charging circuit for charging at least one first storage capacitor of the integrated circuit while the integrated circuit is being adequately supplied with power by means of a power supply field, and comprising a first discharge circuit for discharging the at least one storage capacitor from a first starting time when the integrated circuit is no longer adequately supplied, wherein the discharge behavior of the at least one storage capacitor is affected by the IC material and by at least one radiation effect, and comprising means for determinating a disconnection time information which is significant for a disconnection period, in which disconnection period the integrated circuit has not been adequately supplied with power, the disconnection time information being determined on the basis of the discharge behavior of the at least one first storage capacitor, which is affected by the IC material and by radiation, so that the disconnection time behavior is available from a determination time, and comprising means for correcting the determined disconnection time information in dependence on the effects of the IC material and/or on the at least one radiation effect.

To achieve the object described above, features according to the invention are provided in a data carrier according to the invention, so that a data carrier according to the invention can be characterized in the following way:

A data carrier for the contactless communication with a communication partner device, which data carrier is provided with an integrated circuit according to the invention.

The provision of the features according to the invention has the advantageous and easily achieved result that the data carrier stores, for instance, a set mute bit or the mute state during short temporary disconnections of the power supply field of a communication partner device set up as a reader station, while the mute bit is no longer stored after a changeover from one reader station to another reader station, which changeover involves comparatively longer disconnections of the power supply field, so that the data carrier can, for instance, react and reply to an inventory prompt of the other reader station. This is achieved by the determination of disconnection time information which is significant for a disconnection period, in which disconnection period the data carrier has not been adequately supplied with power. A further particular advantage of the measures according to the invention lies in the fact that the at least one first storage capacitor is discharged via a comparatively low discharge current and therefore only requires a relatively low capacitance and thus only little space when implemented in an integrated circuit, and in the fact that the disconnection period can be determined very precisely.

Such disconnection time information can be determined by digitally measuring the discharge voltage of the at least one first storage capacitor by means of an analog-to-digital converter at a determination time after which the data carrier is once again adequately supplied with power and then calculating the disconnection period according to known physical laws governing the discharge behavior of the storage capacitor, while the effects of the IC material are taken into account in the form of IC process parameters stored on the data carrier and, in addition, the current IC temperature may be measured and taken into account if required.

It has been found to be particularly advantageous if the measures according to claim 2 or claim 6 respectively are provided in addition. These offer the advantage that the disconnection time information can be obtained in a particularly simple way and that, in particular, the correction of the disconnection time information in dependence on the effect of the IC material and on at least one radiation effect, such as a defined temperature variation leading to a change in the ohmic resistance values determining the discharge process, is achieved automatically, because said effects affect both the first storage capacitor and the second storage capacitor and therefore average out, so that corrected disconnection time information is obtained immediately.

It has been found to be particularly advantageous if the measures according to claim 3 or claim 7 respectively are provided in addition. These offer a particularly simple opportunity of determining the disconnection time information for a "short" or "long" disconnection period with only one storage capacitor, which can in fact be achieved relatively soon after the adequate supply of the integrated circuit is restored.

As a result of the measures according to claim 4, the communication behavior of the data carrier is improved, for instance in an inventory process through a communication station or a reader station.

The measures according to claim 8 offer the advantage that the disconnection time information can be determined relatively soon after the adequate supply of the integrated circuit is restored.

The measures according to claim 9, in particular, expediently ensure that the effects referred to above affect both the first storage capacitor and the second storage capacitor in the same way.

These and other aspects of the invention are apparent from and will be elucidated with reference to the embodiments described hereinafter.

The invention is described further below with reference to embodiments illustrated in the drawings, to which embodiments the invention is, however, not restricted.

Figure 1:
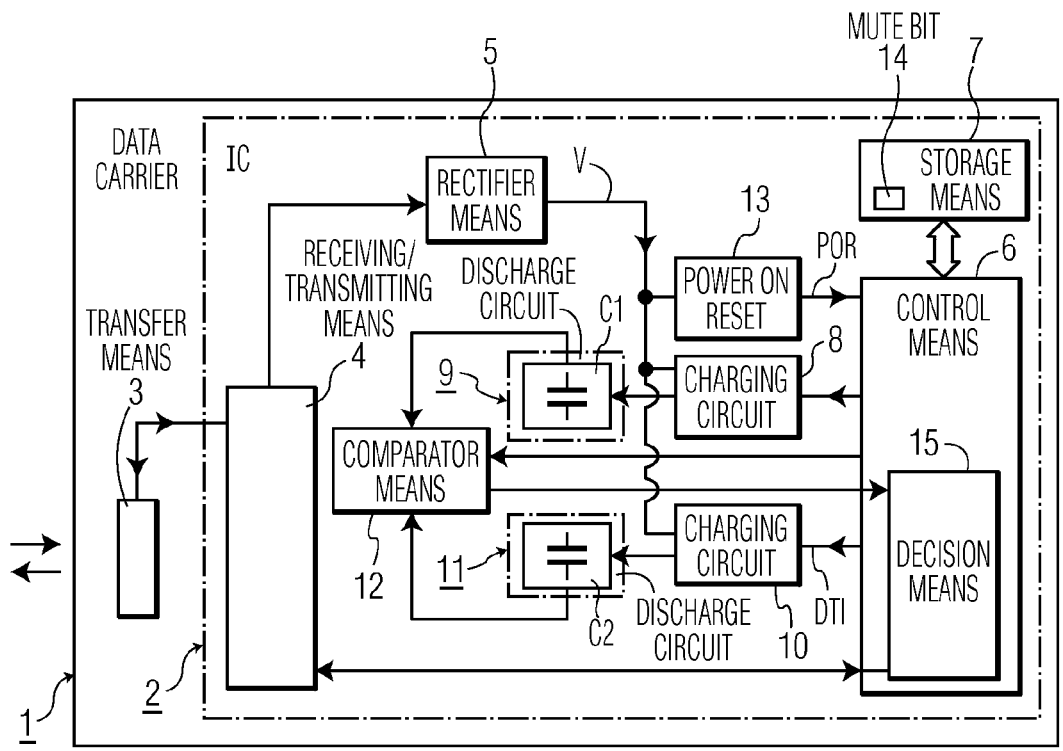
FIG. 1 is a schematic block diagram of those parts of a data carrier according to the invention which are relevant in the present context, the data carrier incorporating an integrated circuit according to the invention.

FIG. 1 shows in a simplified way a data carrier 1, which data carrier 1 is designed as a passive data carrier for contactless communication with a communication partner device or reader station not illustrated here. It should be pointed out in this context that it is largely known among experts that such a data carrier 1 incorporates a number of further functional blocks, which further functional blocks are not shown for clarity and simplicity, but are nevertheless required for the operation of the data carrier 1.

The data carrier 1 comprises an integrated circuit 2 and transfer means 3. The integrated circuit 2 comprises receiving/transmitting means 4, which receiving/transmitting means 4 are connected to the transfer means 3 and include all elements essential for communication with the reader station, i.e. for transmitting and receiving data. A more detailed explanation of the receiving/transmitting means 4 together with the mode of communication with the reader station can be found in the document WO 02/11054 A, the disclosure of which is deemed to be included in this respect.

The integrated circuit 2 further comprises rectifier means 5 connected to the receiving/transmitting means 4 and designed to generate and output a supply voltage V in a way likewise known from the document WO 02/11054 A.

The integrated circuit 2 further comprises process control means 6 and storage means 7, which process control means 6 are represented by a microcomputer (not shown) in the known way and cooperate with the storage means 7 in the known way, whereby the contents of the storage means 7 include control commands, which control commands can be processed with the aid of the microcomputer. It may be mentioned here that the process control means 6 can be represented by a hard-wired logic circuit.

The process control means 6 are further connected to the receiving/transmitting means 4 and are designed for processing received data and for outputting generated, or processed data thereto.

The integrated circuit 2 further comprises a first charging circuit 8 and a first storage capacitor C1 and a first discharge circuit 9 and a second charging circuit 10 and a second storage capacitor C2 and a second discharge circuit 11 as well as comparator means 12 and a power-on-reset stage 13; these elements will be explained in greater detail at a later stage.

As mentioned above, the data carrier 1 is designed as a passive data carrier and therefore generates its supply voltage from the power supply field of the reader station, as has been explained above in the context of the rectifier means 5.

The process of determining the disconnection time information according to the invention is explained below with reference to FIG. 3.

It is assumed that the data carrier 1 is located in the power supply field of the reader station and involved in an inventory process such as described, for instance, in the document WO 02/11054. It is further assumed that the data carrier 1 has already transmitted the data stored in the storage means 7 to the reader station. The reader station has then transmitted a mute command or quiet command to the data carrier 1, whereupon the data carrier 1 has set a mute bit 14 in the storage means 7. As a result of the setting of the mute bit 14, the data carrier 1 no longer replies to the inventory prompts of the reader station, which inventory prompts are transmitted by the reader station in order to prompt any other data carriers to answer and then complete an inventory.

In the present case, the process control means 6 cause the first charging circuit 8 to charge the first storage capacitor C1 while the mute bit 14 is being set, the first charging circuit 8 being represented in the present case by a bipolar transistor circuit and charging the first storage capacitor C1 from the supply voltage V to a voltage U0. It should be mentioned here that the first charging circuit 8 can alternatively be represented by a CMOS circuit or a FET circuit. It should further be mentioned that the supply voltage V is held constant by the rectifier means 5.

Figure 3:
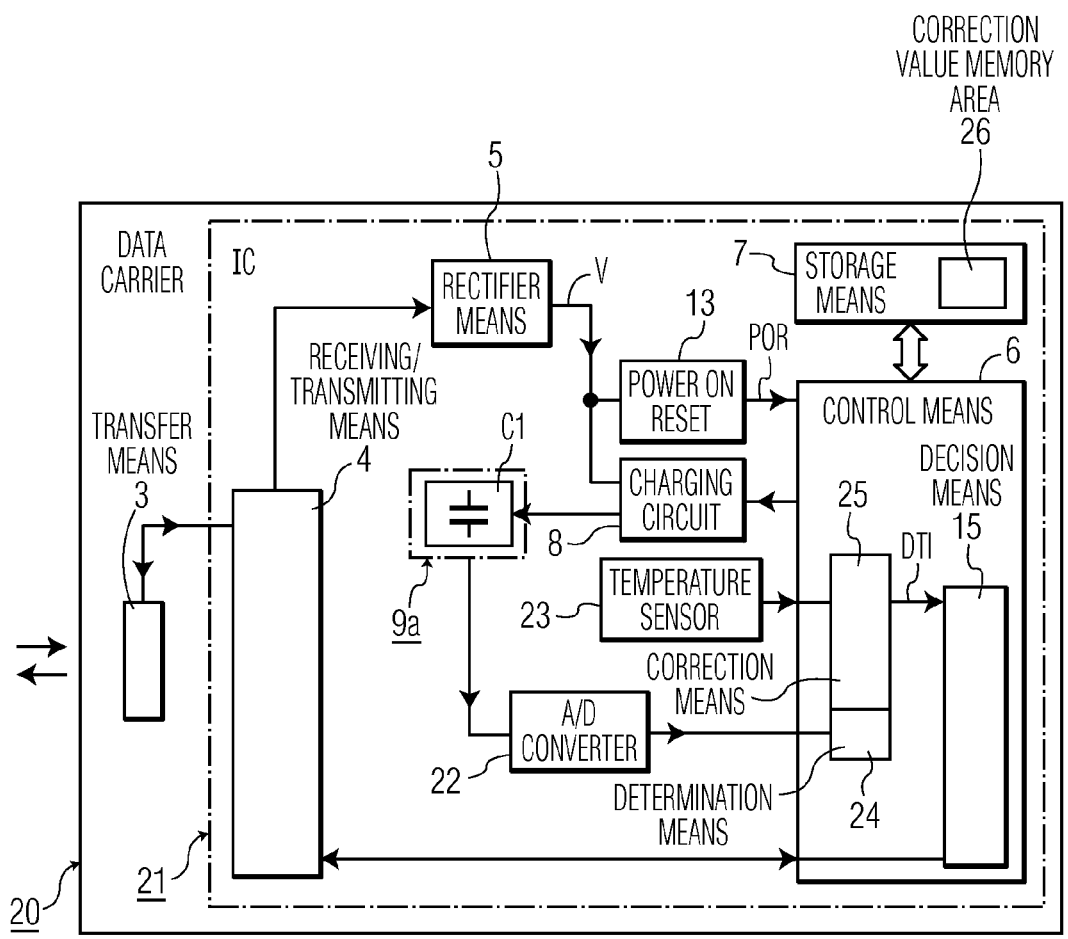
FIG. 3 is a schematic block diagram of those parts of a data carrier according to a third embodiment of the invention which are relevant in the present context.

We shall now assume that the power supply field for the data carrier 1 has failed for a short time, for instance owing to a field extinction, and that there is therefore no longer an adequate power supply, as shown in the first time diagram in FIG. 3, where a first disconnection period DT1, in which the integrated circuit 2 is no longer adequately supplied with power, lasts from a first starting time t1 to a second starting time t2. Such a disconnection period may, for instance, last for one (1) second, may, however, be shorter, for instance 100 milliseconds, or longer, for instance up to ten (10) seconds.

From the second starting time t2, power supply is once again adequate, a condition reflected by a re-established supply voltage V. The rise of the supply voltage V at the second starting time t2 causes the power-on-reset stage 13 connected to the rectifier means 5 to output a reset signal POR to the process control means 6, which, among other things, causes the process control means 6 to activate the second charging circuit 10. Like the first charging circuit 8, the second charging circuit 10 is here represented by a bipolar transistor circuit and can, on activation by the process control means 6, charge the second-storage capacitor C2 from the supply voltage V to a voltage U0. The second storage capacitor C2 is charged up to a third starting time t3, as shown in the second time diagram in FIG. 3. It should further be mentioned that the charging process of the second storage capacitor C2 can be relatively quick, so that the third starting time t3 follows the second starting time t2 virtually immediately.

From the first starting time t1, the first storage capacitor C1 is discharged by means of the first discharge circuit 9, which first discharge circuit 9 is here represented by a leakage current circuit or a leakage current drain. The first storage capacitor C1 is therefore discharged with the aid of a leakage current. In the present case, the leakage current drain is represented by the gate of a FET.

The process control means 6 are likewise adapted such that the first storage capacitor C1 is not again charged by means of the first charging circuit 8 following the occurrence of the reset signal POR at the second starting time t2, which means that the first storage capacitor C1 continues to be discharged steadily.

From the third starting time t3 onwards, the second storage capacitor C2 is also discharged by means of the second discharge circuit 11, which second discharge circuit 11 is here likewise represented by a leakage current circuit or a leakage current drain. The second storage capacitor C2 is therefore discharged with the aid of a leakage current. In the present case, the leakage current drain for the second storage capacitor C2 is also represented by the gate of a FET.

Following this, the process control means 6 initiate a determination of disconnection time information DTI at a determination time t4 separated from the third starting time t3 by a period TPR, which disconnection time information DTI is significant for the disconnection period DT1. In the present case, the comparator means 12 are activated at the determination time t4, which comparator means 12 compare the discharge voltage of the first storage capacitor C1 present at the determination time t4 to the discharge voltage of the second storage capacitor C2 and determine the disconnection time information DTI in dependence on a result of the comparison and output it to decision means 15 incorporated in the process control means 6. As the second time diagram of FIG. 3 shows, the discharge voltage of the first storage capacitor C1 is higher than the discharge voltage of the second storage capacitor C2 at the determination time t4. The disconnection time information DTI delivered to the decision means 15 therefore includes the information that there has been a "short" disconnection period DT1, with the result that the decision means 15 prevent the data carrier 1 from replying or reacting to inventory requests of the reader station.

Another application is based on the assumption that a faultless power supply for the data carrier 1 is unavailable for a comparatively longer period, for instance owing to a local transfer of the data carrier 1 from one reader station to another reader station, and that there is therefore no longer an adequate power supply, as shown in the third time diagram in FIG. 3, where a second disconnection period DT2, in which the integrated circuit 2 is no longer adequately supplied with power, lasts from a first starting time t1 to a second starting time t2. Such a disconnection period may, for instance, last ten (10) seconds, may, however, last much longer, for instance some minutes or hours.

In this case, the disconnection time information DTI is determined by analogy with the process described immediately above for the identification of the disconnection period DT1.

As the fourth time diagram in FIG. 3 shows, the discharge voltage of the first storage capacitor C1 is lower at the determination time t4 than the discharge voltage of the second storage capacitor C2. As a result, the disconnection time information DTI output to the decision means 15 includes the information that there has been a "long" disconnection period DT2, with the result that the decision means 15 enable the data carrier 1 to reply or react to inventory prompts of the other reader station.

In the two cases described above, which relate to the disconnection periods DT1 and DT2, the first storage capacitor C1 has a capacitance of approximately ten (10) picofarads (pF) and the second storage capacitor C2 only a tenth of the capacitance of the first storage capacitor C1, i.e. one (1) picofarad (pF). The leakage current drains are in both cases designed for discharging both the first storage capacitor C1 and the second storage capacitor C2 at the same leakage current level. It should be mentioned that the first storage capacitor C1 and the second storage capacitor C2 can have the same capacitance, in which case the leakage current drains have to be designed for discharging the first storage capacitor C1 and the second storage capacitor C2 at different leakage current levels. Different leakage current drains can, for instance, be implemented by different sizing of the above-mentioned gates of one FET each.

Figure 2:
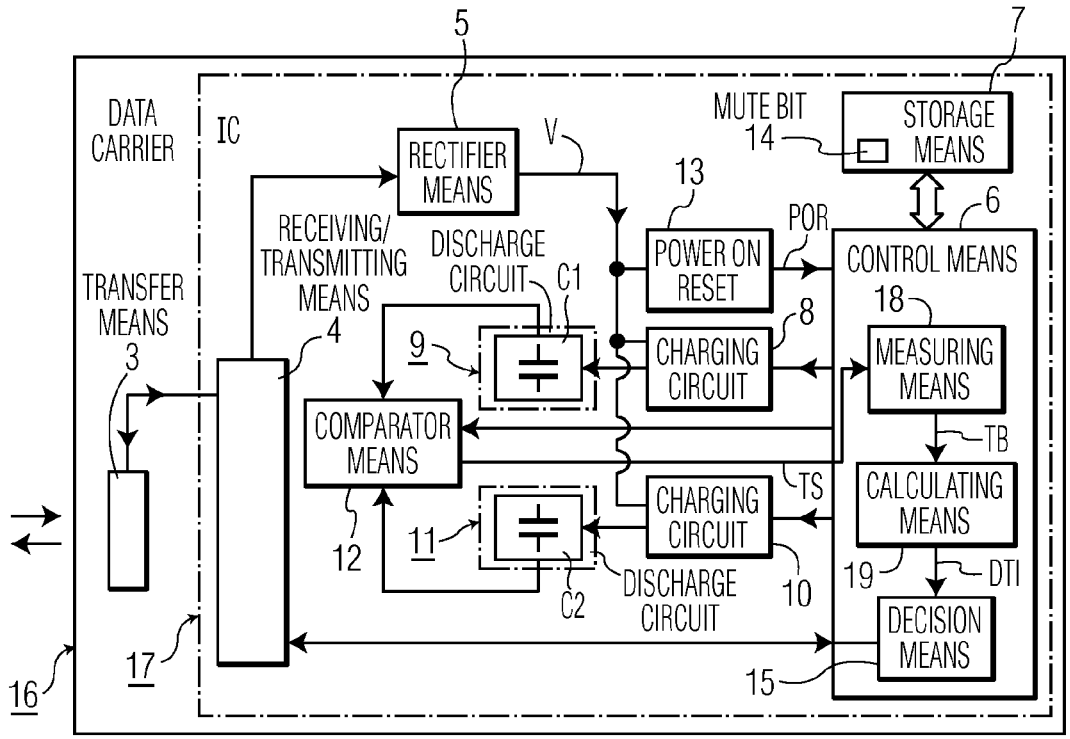
FIG. 2 is a schematic block diagram of those parts of a data carrier according to a second embodiment of the invention which are relevant in the present context.
Figure 4:
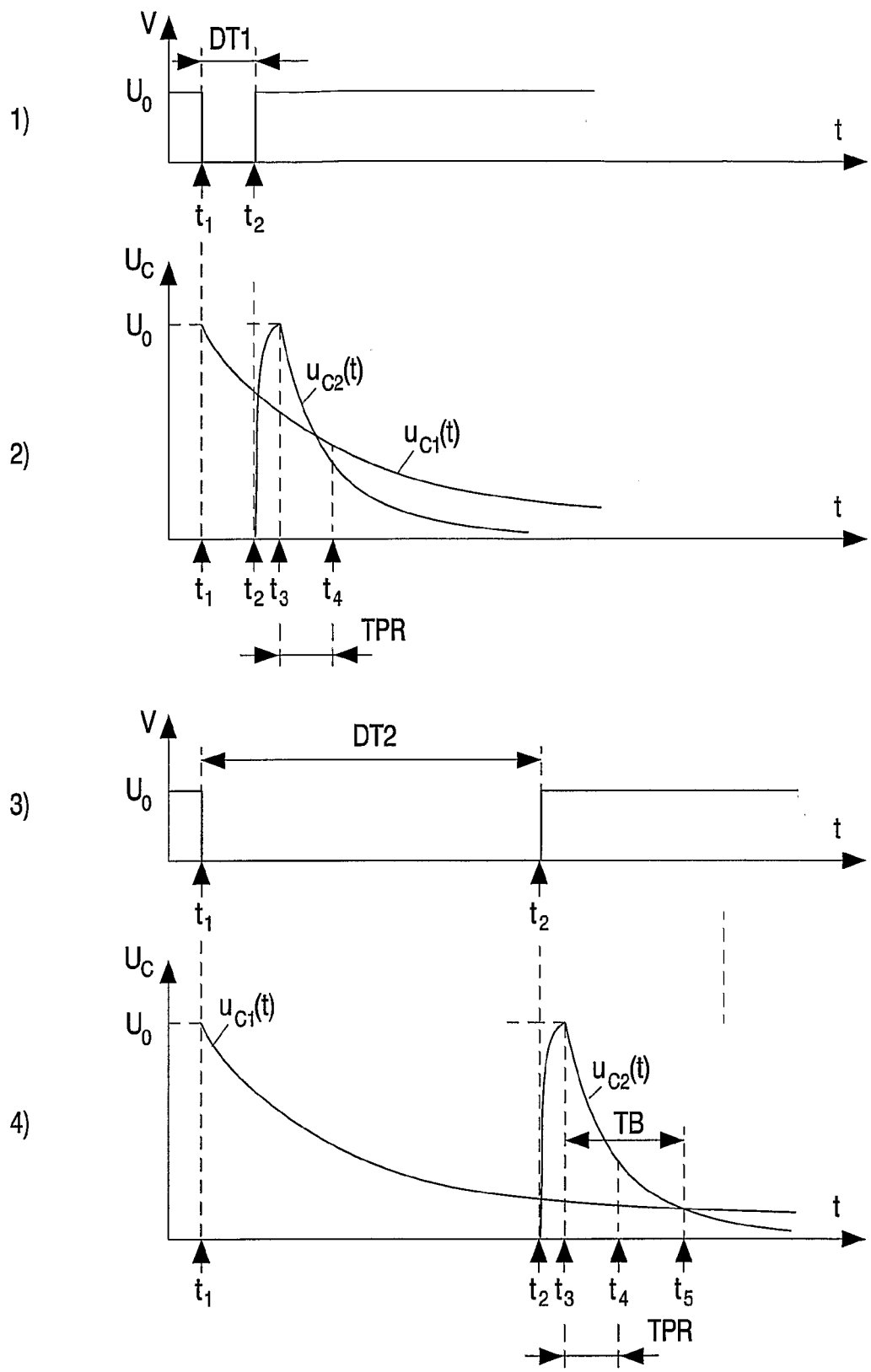
FIG. 4 is a schematic signal/time diagram showing the occurrence in time of electrical discharge voltages of storage capacitors according to FIG. 1, which discharge voltages are used in the determination of supply disconnection time information according to the invention.

FIG. 2 shows a data carrier 16 similar to the data carrier 1, which data carrier 16 comprises an integrated circuit 17 incorporating for the major part the same elements identified by the same reference numbers as the integrated circuit 2. The comparator means 12 are here designed or adapted to determine the intersection time t5 shown in the fourth time diagram in FIG. 4, at which intersection time t5 the discharge voltage of the first storage capacitor C1 is equal to the discharge voltage of the second storage capacitor C2. The process control means 6 are additionally provided with measuring means 18 and calculating means 19. When the intersection time t5 is reached, the comparator means 12 output a trigger signal TS to the measuring means 18, which trigger signal TS ends or stops a time measurement started by the measuring means 18 from the third starting time t3 and causes the measuring means 18 to determine a measuring period TB, which measuring period TB starts at the third starting time t3 and ends at the intersection time t5. The measuring period TB is output to the calculating means 19 by the measuring means 18. The calculating means 19 are adapted for calculating, as a product of the measuring time TB and the ratio—reduced by unity (1) —of the capacitance of the first storage capacitor C1 to the capacitance of the second storage capacitor C2, the disconnection period DT1 or DT2 respectively from known physical laws and from the contexts of the discharge processes of the first storage capacitor C1 and the second storage capacitor C2. In this case, the decision means 15 are designed for comparing the calculated value of the disconnection period DT1 or DT2 respectively to a comparison value stored in the storage means 7, and for deciding in dependence thereon, whether there is a "long" period or a "short" period.

Figure 6:
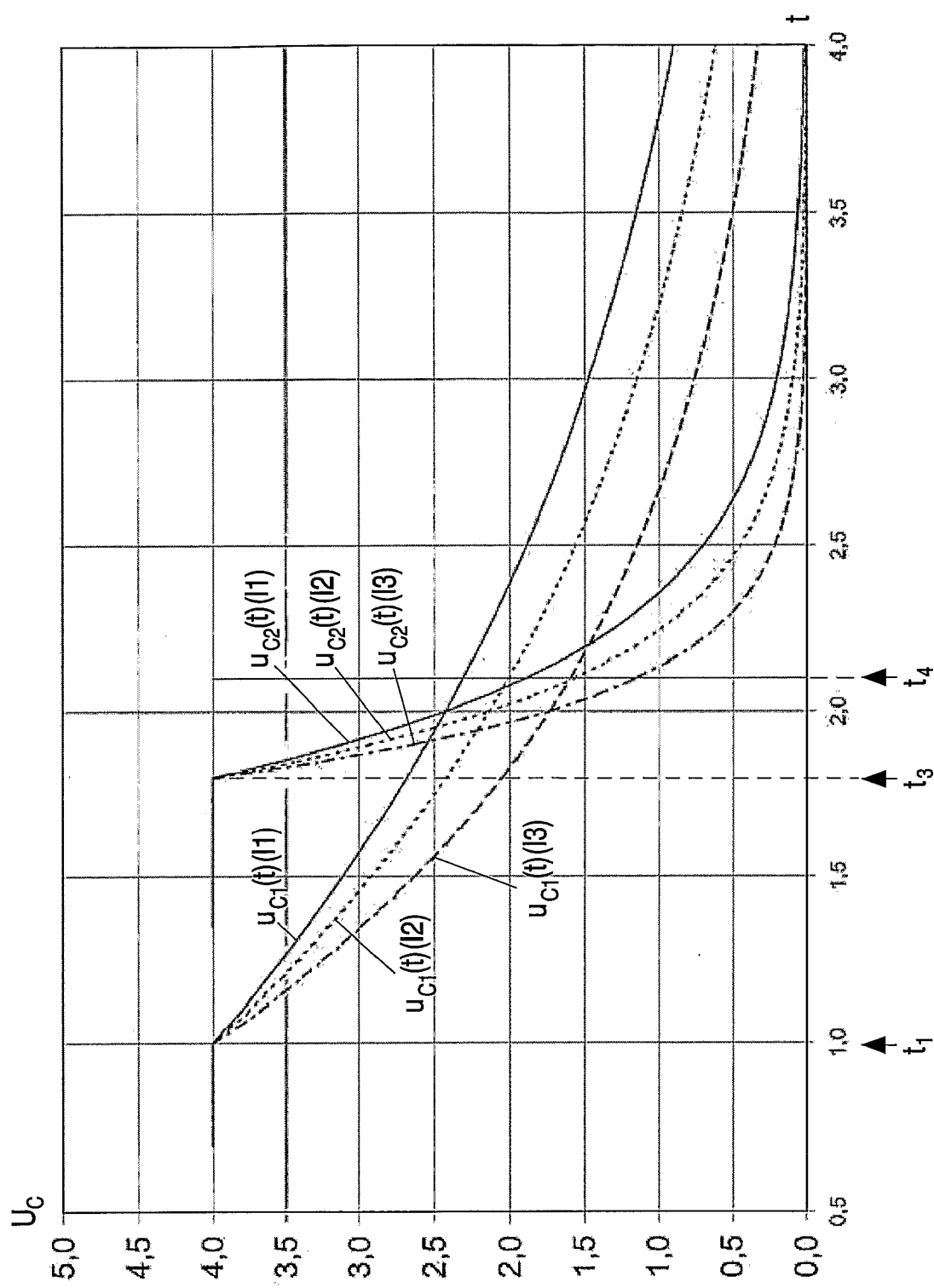
FIGS. 6 and 7 are detailed signal/time diagrams according to FIG. 4.
Figure 7:
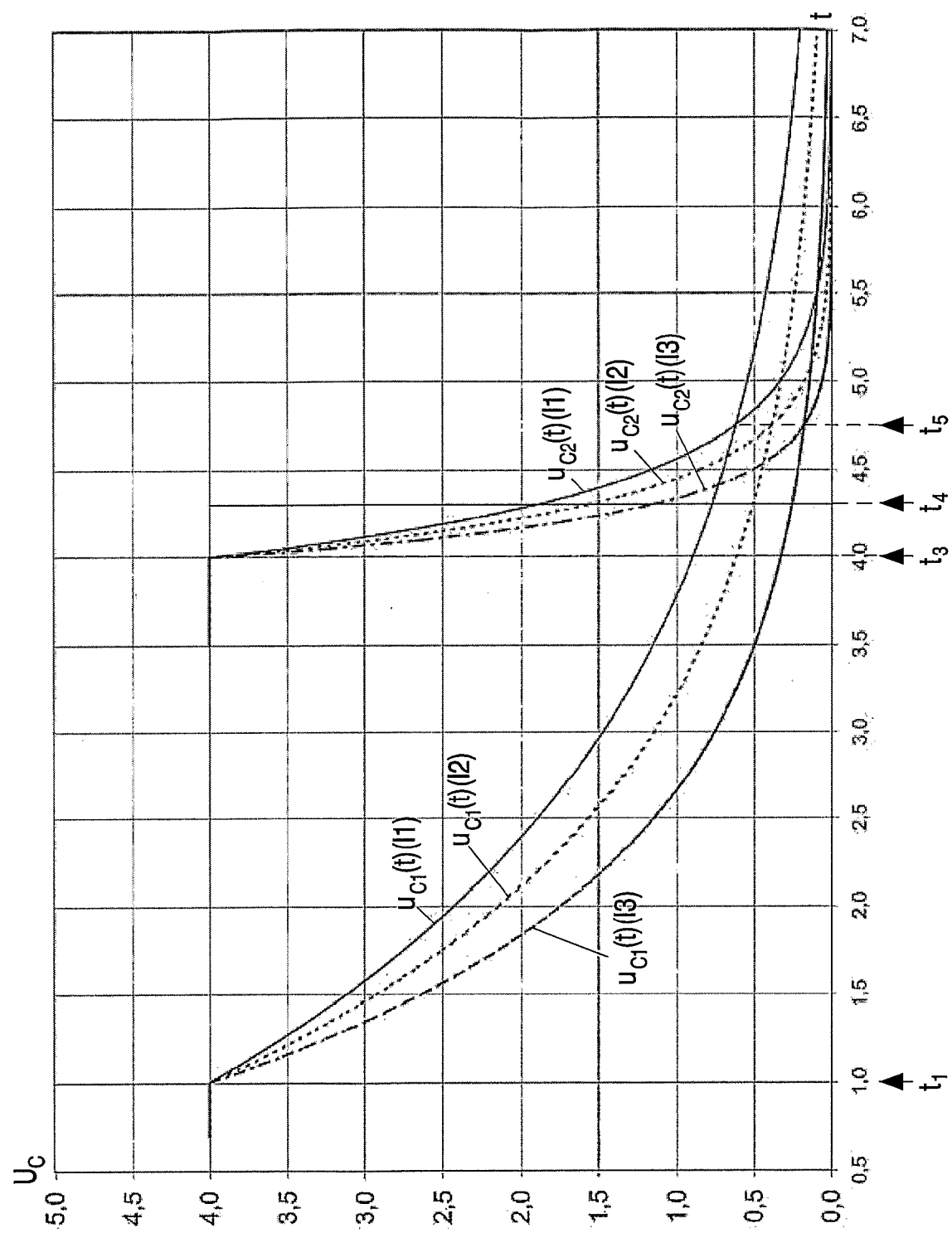

At this point, it should be stated that the intersection time t5 and thus the measuring period TB can be established or determined the more precisely, the lower the capacitance of the second storage capacitor C2 is, because this results in a "steeper" intersection (crossing point) of the discharge curve of the first storage capacitor C1 with the discharge curve of the second storage capacitor C2. In addition, the identification of the disconnection period as described above with reference to FIG. 2 is highly expediently made independent of influences of the IC material and of the effects of at least one radiation, like for example temperature or light, and therefore relatively accurate. Such an interrelation of the effects of different leakage currents is illustrated by FIG. 6 and FIG. 7. FIG. 6 shows calculated chronological voltage curves of the discharge of the first storage capacitor C1 and the second storage capacitor C2, similar to those in the second time diagram in FIG. 4. The calculations are based on a C1/C2 ratio of five (5). The units are arbitrary.

In addition, FIG. 6 and FIG. 7 respectively show a dependence, or the effect of different leakage currents, on the voltage curves for the leakage currents I1, I2 and I3. While FIG. 6 shows a "short" disconnection period DT1, FIG. 7 shows a "long" disconnection period DT2. It should, in particular, be pointed out that the intersection times t5 of the voltage curves always deliver the same point in time at each leakage current.

It can further be mentioned that the integrated circuit 2 of the data carrier 1 and the integrated circuit 17 of the data carrier 16 can contain different capacitor pairs, each with a first storage capacitor C1 and a second storage capacitor C2 of different capacitances, so that the different capacitor pairs can be used to establish or determine different disconnection periods DT. This can further improve the accuracy of establishing or determining such disconnection periods DT and cover a larger time range. In this case, the process control means 6 are designed for selecting a suitable capacitor pair for each disconnection period DT to be determined; with this capacitor pair, a disconnection period DT is then determined as described above with reference to FIG. 1.

FIG. 3 shows a data carrier 20 similar to the data carrier 1, which data carrier 20 comprises an integrated circuit 21 incorporating for the major part the same elements identified by the same reference numbers as the integrated circuit 2. In addition, an A/D converter 22 and a temperature sensor 23 are provided. The process control means 6 additionally incorporate determination means 24 and correction means 25. The A/D converter 22 is connected to the first storage capacitor C1 and designed for measuring the voltages of the first storage capacitor C1 and for outputting digitized voltage level signals to the determination means 24.

For the determination of the disconnection time information DTI, the discharge voltage of the at least one first storage capacitor C1 is measured digitally by means of the A/D converter 22 at a determination time t2, after which determination time t2 the data carrier 20 is once again adequately supplied with power, following which the disconnection period is calculated with the aid of the determination means 24 in accordance with known physical laws governing the discharge behavior of the storage capacitors. The disconnection time information DTI determined in this way is then corrected in the correction means 25, using correction values stored in a correction value memory area 26 of the storage means 7, which correction values take account of the effects of the IC material and thus of the discharge behavior of the first storage capacitor C1. If required, the current IC temperature can additionally be measured by means of the temperature sensor 23, and the measured temperature value can be output to the correction means 25, whereby the correction means 25 then take this temperature value into account when correcting the disconnection time information DTI. In this case, the disconnection time information DTI output to the decision means 15 corresponds to the value of the disconnection period DT in which the data carrier 20 was not adequately supplied with power. The decision means 15 are in this case designed for comparing this disconnection time information DTI to a comparison value stored in the storage means 7 and, in dependence thereon, for making further decisions or setting actions affecting the communication behavior of the data carrier 20.

Comparatively simpler disconnection time information DTI with only one information item on a "short" or "long" disconnection period, similar to the one explained with reference to FIG. 1, is also possible in a modified form in the data carrier 20, which is now illustrated with reference to FIG. 5. For simplicity, the time diagrams shown in FIG. 5 feature the same times or starting times as those in FIG. 4.

Figure 5:
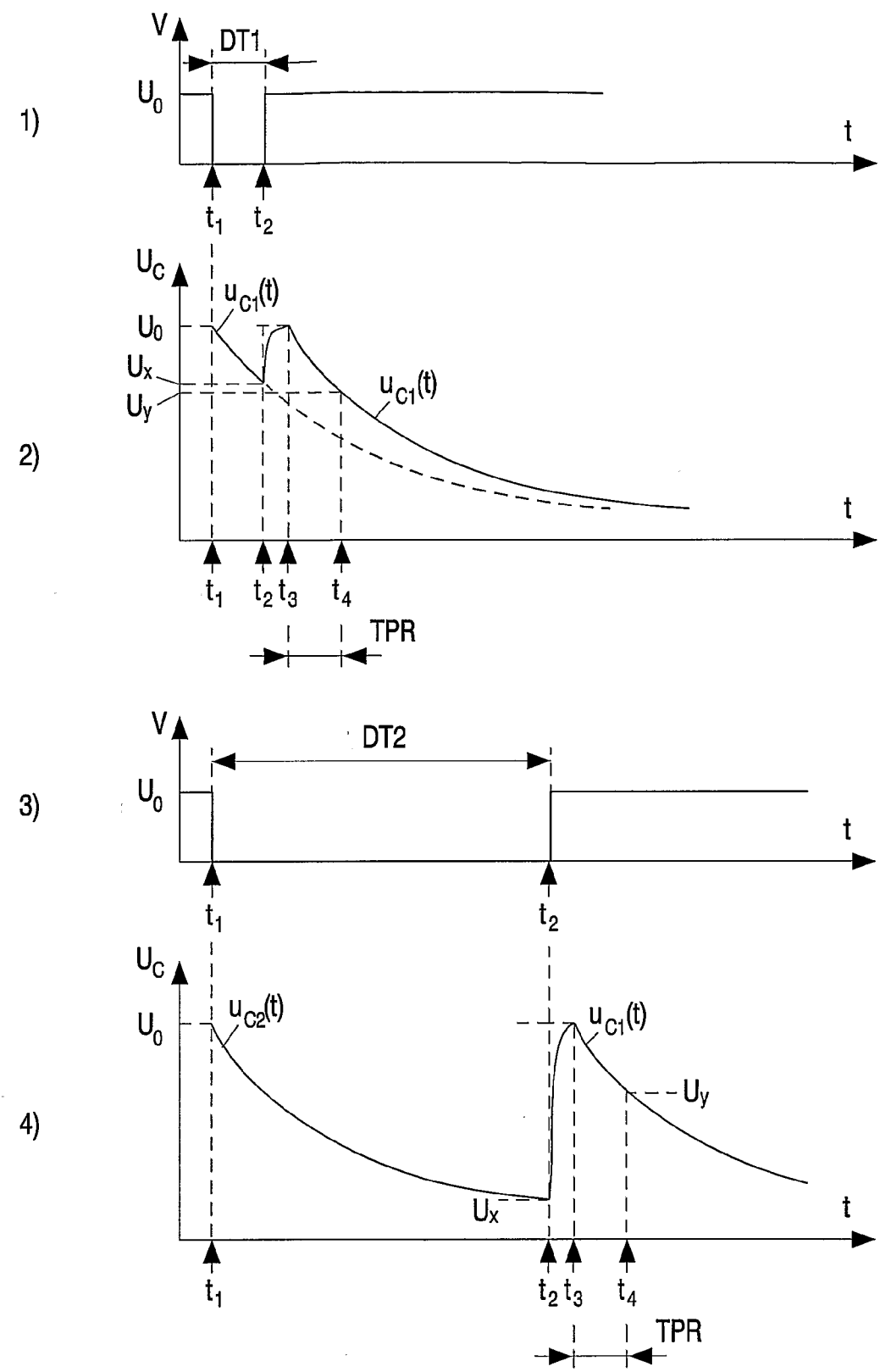
FIG. 5 is a schematic signal/time diagram showing the occurrence in time of electrical discharge voltages of storage capacitors according to FIG. 3, which discharge voltages are used in the determination of supply disconnection time information according to the invention.

As the second time diagram of FIG. 5 indicates, the first storage capacitor C1 is discharged from the starting time t1. In the modified data carrier 20 referred to above, the process control means 6 are designed for recharging the first storage capacitor C1 at the second starting time t2, i.e. immediately following the re-establishment of the adequate supply of the data carrier 20. From the third time t3, the charged first storage capacitor C1 is once again discharged, a process which runs up to the determination time t4. The determination means 24 are here designed for determining and comparing the discharge voltage of the first storage capacitor C1 at the second starting time t2 and at the determination time t4 with the aid of the A/D converter 22. In FIG. 5, the discharge voltage determined at the second starting time t2 is identified as Ux, while the discharge voltage determined at the determination time t4 is identified as Uy. In the case illustrated in the first and second time diagrams of FIG. 5, a comparison between Ux and Uy shows that Ux is greater than Uy. As a result, the determination means 24 output as disconnection time information DTI to the decision means 15 the information that the disconnection period DT1 was "short". In the case illustrated in the third and fourth time diagrams of FIG. 5, a comparison between Ux and Uy shows that Ux is less than Uy. As a result, the determination means 24 output as disconnection time information DTI to the decision means 15 the information that the disconnection period DT2 was "long".

It should be mentioned that variations or fluctuations of U0 at the times when the storage capacitors are being charged can be taken into account by measuring U0 at the relevant times, wherefrom correction values for the disconnection period can be calculated if required.

At this point, it should further be mentioned that the term radiation includes different types of radiation, such as thermal radiation, light radiation, ionic radiation, radioactive radiation etc. Radiation can affect a data carrier according to the invention and its integrated circuit externally. Radiation can also be generated internally, such as thermal radiation caused by internal losses.

The invention claimed is:

1. A method of determining disconnection time information which is significant for a disconnection period in which disconnection period an integrated circuit of a data carrier designed for contactless communication with a communication partner device has not been adequately supplied with power by a power supply field, the method comprising: charging at least one first storage capacitor of the integrated circuit while the integrated circuit is being adequately supplied with power; discharging the at least one first storage capacitor from a first starting time when the integrated circuit is subsequently no longer adequately supplied with power; determining the disconnection time information on the basis of the discharge behavior, which is affected by the IC material and by radiation, of the at least one first storage capacitor: and correcting the determined disconnection time information in dependence on the effects of at least one of the IC material and at least one radiation effect, and on the basis of the discharge behavior of the at least one first storage capacitor and on discharge behavior of a second storage capacitor of the integrated circuit, wherein a renewed charging of the at least one first storage capacitor is prevented from a second starting time following the first starting time, from which second starting time an adequate supply is re-established, to a determination time and wherein the second storage capacitor is charged from the second starting time and wherein the second storage capacitor is discharged from a third starting time following the second starting time and wherein the discharge voltage of the at least one first storage capacitor is compared to the discharge voltage of the second storage capacitor at the determination time following the third starting time and wherein the disconnection time information is determined in dependence on a result of the comparison.

2. A method as claimed in claim 1, wherein the disconnection time information is used to decide whether the data carrier is to respond to certain prompt commands of the communication partner device.

3. A method of determining disconnection time information which is significant for a disconnection period in which disconnection period an integrated circuit of a data carrier designed for contactless communication with a communication partner device has not been adequately supplied with power by a power supply field, the method comprising: charging at least one first storage capacitor of the integrated circuit while the integrated circuit is being adequately supplied with power; discharging the at least one first storage capacitor from a first starting time when the integrated circuit is subsequently no longer adequately supplied with power; determining the disconnection time information on the basis of the discharge behavior, which is affected by the IC material and by radiation, of the at least one first storage capacitor; and correcting the determined disconnection time information in dependence on the effects of at least one of the IC material and at least one radiation effect, and on the basis of the discharge behavior of the at least one first storage capacitor, wherein the first storage capacitor is charged from a second starting time following the first starting time from which second starting time an adequate supply is re-established, and wherein the first storage capacitor is discharged from a third starting time following the second starting time and wherein the discharge voltage of the first storage capacitor present at the second starting time is compared to the discharge voltage of the first storage capacitor present at the determination time following the third starting time and wherein the disconnection time information is determined in dependence on a result of the comparison.

4. An integrated circuit of a data carrier designed for contactless communication with a communication partner device, comprising: a first charging circuit for charging at least one first storage capacitor of the integrated circuit while the integrated circuit is being adequately supplied by a power supply field; a first discharge circuit for discharging the first storage capacitor following a first starting time when the integrated circuit is no longer adequately supplied with power, the discharge behavior of the at least one storage capacitor being affected by the IC material and by at least one radiation effect; determination logic circuitry for determining disconnection time information which is significant for a disconnection period in which disconnection period the integrated circuit has not been adequately supplied with power, the disconnection time information being determined on the basis of the discharge behavior of the at least one first storage capacitor so that the disconnection time information is available from a determination time; and correction logic circuitry for the correction of the determined disconnection time information in dependence on the effects of at least one of the IC material and the at least one radiation effect, and on the basis of the discharge behavior of the at least one first storage capacitor and on at least one of the discharge behavior of a second storage capacitor of the integrated circuit and a temperature indication of the integrated circuit, wherein a renewed charging of the at least one first storage capacitor is prevented with the aid of the determination logic circuitry from a second starting time following the first starting time, from which second starting time an adequate supply is re-established, to a determination time, and wherein a second charging circuit is provided for charging the second storage capacitor from the second starting time and wherein a second discharge circuit is provided for discharging the second storage capacitor from a third starting time following the second starting time wherein the discharge behavior of the second storage capacitor is affected by the IC material and by the at least one radiation effect, and wherein the determination logic circuitry is designed for comparing the discharge voltage of the at least one first storage capacitor to the discharge voltage of the second storage capacitor at the determination time following the third starting time and for determining the disconnection time information in dependence on a result of the comparison.

5. An integrated circuit as claimed in claim 4, wherein the capacitance of the at least one first storage capacitor corresponds to a multiple of the capacitance of the second storage capacitor.

6. An integrated circuit as claimed in claim 4, wherein the at least one first storage capacitor and the second storage capacitor are arranged immediately adjacent to one another in the integrated circuit.

7. A data carrier for contactless communication with a communication partner device, which data carrier is provided with an integrated circuit as claimed in claim 4.

8. An integrated circuit of a data carrier designed for contactless communication with a communication partner device, comprising: a first charging circuit for charging at least one first storage capacitor of the integrated circuit while the integrated circuit is being adequately supplied by a power supply field; a first discharge circuit for discharging the first storage capacitor following a first starting time when the integrated circuit is no longer adequately supplied with power, the discharge behavior of the at least one storage capacitor being affected by the IC material and by at least one radiation effect; determination logic circuitry for determining disconnection time information which is significant for a disconnection period in which disconnection period the integrated circuit has not been adequately supplied with power, the disconnection time information being determined on the basis of the discharge behavior of the at least one first storage capacitor so that the disconnection time information is available from a determination time; and correction logic circuitry for the correction of the determined disconnection time information in dependence on the effects of at least one of the IC material and the at least one radiation effect, and on the basis of the discharge behavior of the at least one first storage capacitor and on at least one of the discharge behavior of a second storage capacitor of the integrated circuit and a temperature indication of the integrated circuit, wherein a renewed charging of the at least one first storage capacitor can be started with the aid of the determination logic circuitry from a second starting time following the first starting time from which second starting time an adequate supply is re-established, and wherein the first discharge circuit is provided for discharging the first storage capacitor from a third starting time following the second starting time wherein the determination logic circuitry is designed for comparing the discharge voltage of the first storage capacitor present at the second starting time to the discharge voltage of the first storage capacitor present at the determination time following the third starting time and for determining the disconnection time information in dependence on a result of the comparison.

9. A circuit for determining disconnection time information for a disconnection period in which disconnection period an integrated circuit of a data carrier designed for contactless communication with a communication partner device has not been adequately supplied with power, the circuit comprising:
at least one first storage capacitor arranged in the integrated circuit for discharging from a first starting time when the integrated circuit is subsequently no longer adequately supplied with power,
a second storage capacitor arranged in the integrated circuit for discharging from a second starting time that is after the first starting time,
a first charge circuit arranged to charge the at least one first storage capacitor while the integrated circuit is being adequately supplied with power,
a logic circuit configured and arranged for
determining the disconnection time information on the basis of the discharge behavior of the second storage capacitor, and the discharge behavior, which is affected by the IC material and by radiation, of the at least one first storage capacitor, and
correcting the determined disconnection time information in dependence on the effects of at least one of the IC material and at least one radiation effect.

10. The circuit of claim 9, wherein the logic circuit includes a computer configured and arranged for at least one of
determining the disconnection time information on the basis of the discharge behavior, which is affected by the IC material and by radiation, of the at least one first storage capacitor, and
correcting the determined disconnection time information in dependence on the effects of at least one of the IC material and at least one radiation effect, and on the basis of the discharge behavior of the at least one first storage capacitor and on the discharge behavior of the second storage capacitor of the integrated circuit.

11. The circuit of claim 9, wherein the logic circuit includes a hard-wired logic circuit configured and arranged for at least one of
determining the disconnection time information on the basis of the discharge behavior, which is affected by the IC material and by radiation, of the at least one first storage capacitor, and
correcting the determined disconnection time information in dependence on the effects of at least one of the IC material and at least one radiation effect, and on the basis of the discharge behavior of the at least one first storage capacitor and on the discharge behavior of the second storage capacitor of the integrated circuit.

12. The circuit of claim 9, wherein the logic circuit includes a comparator circuit configured and arranged to compare, respectively, charges of the first and second storage capacitors, and wherein an output from the comparator circuit is used for determining the disconnection time information.

13. The circuit of claim 9, wherein the logic circuit includes a computer and a comparator circuit configured and arranged to compare, respectively, charges of the first and second storage capacitors, the computer being responsive to an output from the comparator circuit for determining the disconnection time information.

14. The circuit of claim 9, wherein the determined disconnection time information is corrected, at least in part, on the basis of a temperature indication of the integrated circuit.

15. A circuit for determining disconnection time information for a disconnection period in which disconnection period an integrated circuit of a data carrier designed for contactless communication with a communication partner device has not been adequately supplied with power, the circuit comprising:

at least one first storage capacitor arranged in the integrated circuit for discharging from a first starting time when the integrated circuit is subsequently no longer adequately supplied with power, a second storage capacitor arranged in the integrated circuit for discharging from a second starting time corresponding to the integrated circuit being supplied with adequate power subsequent to the first starting time, a first charge circuit arranged to charge the at least one first storage capacitor while the integrated circuit is being adequately supplied with power, a logic circuit configured and arranged for determining the disconnection time information on the basis of the discharge behavior, which is affected by the IC material and by radiation, of the at least one first storage capacitor and on the basis of the discharge behavior of the second storage capacitor, and correcting the determined disconnection time information in dependence on the effects of at least one of the IC material and at least one radiation effect, and on the basis of a temperature indication of the integrated circuit.

16. The circuit of claim 15, further including a temperature sensor configured and arranged to provide a signal representing the temperature indication, and wherein the determined disconnection time information is corrected, at least in part, on the basis of the temperature indication of the integrated circuit.

17. The circuit of claim 15, wherein logic circuit is further configured and arranged for correcting the determined disconnection time information by selected stored values to account for both the discharge behavior of at least one of the first and second storage capacitors and the temperature indication of the integrated circuit.

18. The circuit of claim 15, further comprising a second charge circuit arranged to charge the second storage capacitor from a third starting time that occurs when an adequate power supply is re-established to the integrated circuit, the third starting time being after the first starting time and before the second starting time.

19. The circuit of claim 9, further comprising a second charge circuit arranged to charge the second storage capacitor from a third starting time that occurs when an adequate power supply is re-established to the integrated circuit, the third starting time being after the first starting time and before the second starting time.

* * * * *